(12) United States Patent
Drew

(10) Patent No.: US 9,292,043 B2
(45) Date of Patent: Mar. 22, 2016

(54) FLAT PANEL MONITOR STANDS

(75) Inventor: Paul L. Drew, The Woodlands, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 45 days.

(21) Appl. No.: 14/117,701

(22) PCT Filed: Jun. 6, 2011

(86) PCT No.: PCT/US2011/039327
§ 371 (c)(1),
(2), (4) Date: Nov. 14, 2013

(87) PCT Pub. No.: WO2012/170007
PCT Pub. Date: Dec. 13, 2012

(65) Prior Publication Data
US 2014/0085799 A1   Mar. 27, 2014

(51) Int. Cl.
*G06F 1/16* (2006.01)
*F16M 11/10* (2006.01)
*F16M 11/20* (2006.01)

(52) U.S. Cl.
CPC .......... *G06F 1/1601* (2013.01); *F16M 11/105* (2013.01); *F16M 11/2021* (2013.01); *G06F 2200/1612* (2013.01); *Y10T 29/49826* (2015.01); *Y10T 29/49963* (2015.01)

(58) Field of Classification Search
USPC ........... 348/374, 739, 129, 46, 135, 837, 455; 345/173, 174, 175, 156, 168, 634; 349/158, 110, 54, 192; 361/679.21, 361/679.22, 679.23, 679.24, 679.25, 361/679.26, 679.27, 679.01, 679.02, 361/679.34, 679.56, 679.29; 428/131, 137, 428/134, 410, 34
See application file for complete search history.

(56) References Cited

U.S. PATENT DOCUMENTS

| | | | |
|---|---|---|---|
| 6,062,478 A * | 5/2000 | Izaguirre | G06F 1/16 235/462.43 |
| 6,639,788 B1 | 10/2003 | Liao et al. | |
| 7,564,679 B2 | 7/2009 | Chen et al. | |
| 7,646,593 B2 | 1/2010 | Smejkalova | |
| 9,155,235 B2 * | 10/2015 | Lindblad | F16F 3/04 |
| 2007/0008686 A1 * | 1/2007 | Jang | 361/681 |

(Continued)

FOREIGN PATENT DOCUMENTS

KR   20030015642 A   2/2003

OTHER PUBLICATIONS

DELL. 1504FP Flat Panel Color Monitor User's Guide. http://support.dell.com/support/systemsinfo~pulled Oct. 15, 2015~3 pages.

(Continued)

*Primary Examiner* — Hung Duong
(74) *Attorney, Agent, or Firm* — Thorpe, North & Western

(57) ABSTRACT

The present disclosure provides flat panel monitor stands and related systems and methods. The flat panel monitor stands can comprise a base including a pedestal and a support arm extending upwardly from the pedestal, the top portion being distally positioned with respect to the pedestal. The stand can also include a tilt mechanism connected to the top portion of the support arm. A bracket can be pivotally attached to the tilt mechanism at an off-center location on the bracket so that the bracket has a low position and a high position when pivoted about the tilt mechanism. The bracket can also be attachable to a flat panel monitor in both the low position and the high position without reorienting the flat panel monitor.

15 Claims, 5 Drawing Sheets

(56) References Cited

U.S. PATENT DOCUMENTS

| | | |
|---|---|---|
| 2007/0013720 A1 | 1/2007 | McRight et al. |
| 2007/0046840 A1* | 3/2007 | Yokawa .............. F16M 11/00 348/794 |
| 2007/0047187 A1 | 3/2007 | Kumano et al. |
| 2007/0247795 A1 | 10/2007 | Tseng |
| 2010/0309615 A1 | 12/2010 | Grey et al. |
| 2013/0075546 A1* | 3/2013 | Peng et al. .............. 248/125.1 |

OTHER PUBLICATIONS

Guidestobuy.com. Premier Mounts Single Plasma Display Floor Stand, http:://racksandstands.guidestobuy.com~pulled Oct. 15, 2015~4 pages.

* cited by examiner

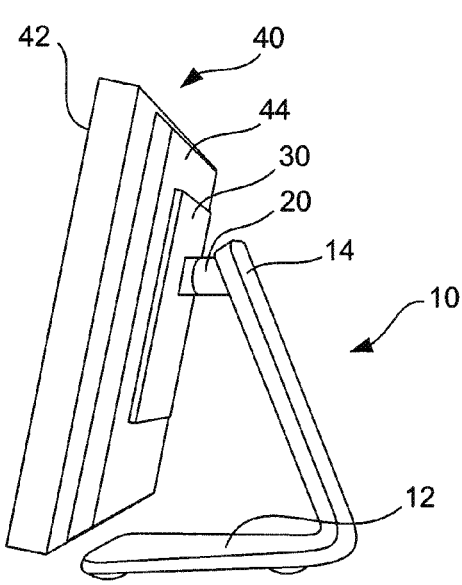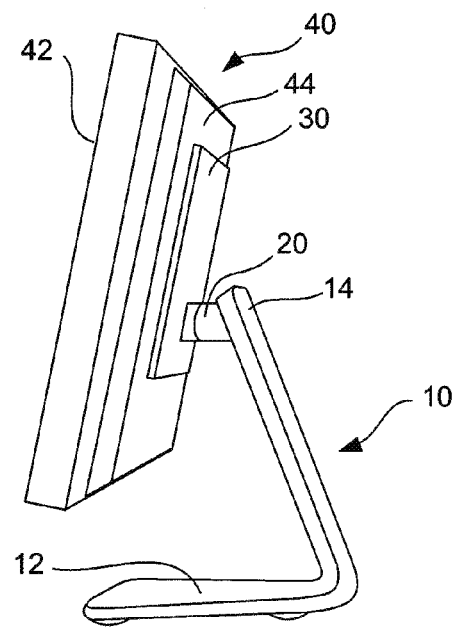
FIG. 1A
FIG. 1B
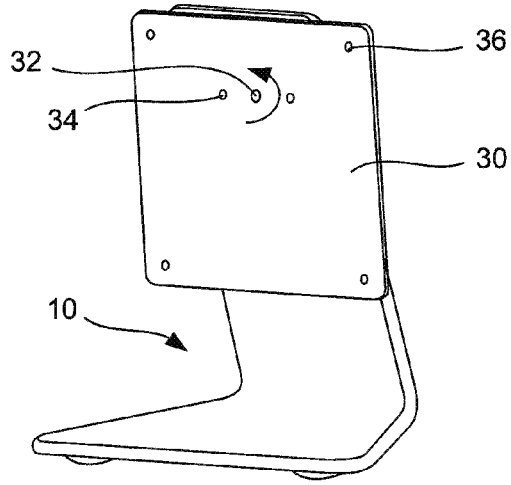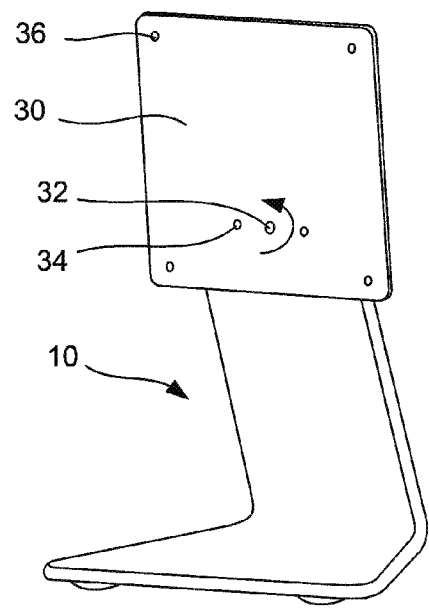
FIG. 2A
FIG. 2B

FLAT PANEL MONITOR STANDS

BACKGROUND

Flat panel monitors have become a standard piece of equipment for use with desktop computers and television systems. However, as flat panel monitors are very thin, that they do not typically stand upright on their own like traditional tube monitors. Rather, they are typically mounted on a wall surface or on a stand. With respect to the use of such stands, there are many different types of flat surfaces positioned at many different heights that can be used to support these stands, e.g., desk top surfaces, table top surfaces, counter top surfaces, floor surfaces, etc. Thus, a stand that provides multiple configurations would be useful to a consumer so that the stand and flat panel monitor can be tailored for use in a specific environment.

BRIEF DESCRIPTION OF THE DRAWINGS

FIGS. 1A and 1B depict a perspective view of an assembled free-standing flat panel monitor stand system in both a first relative low position and a second relative high position in accordance with examples of the present disclosure;

FIGS. 2A and 2B depict a perspective view of a flat panel monitor stand prior to attachment of a monitor in both a first relative low position and a second relative high position in accordance with examples of the present disclosure;

DETAILED DESCRIPTION

Figure 3A:
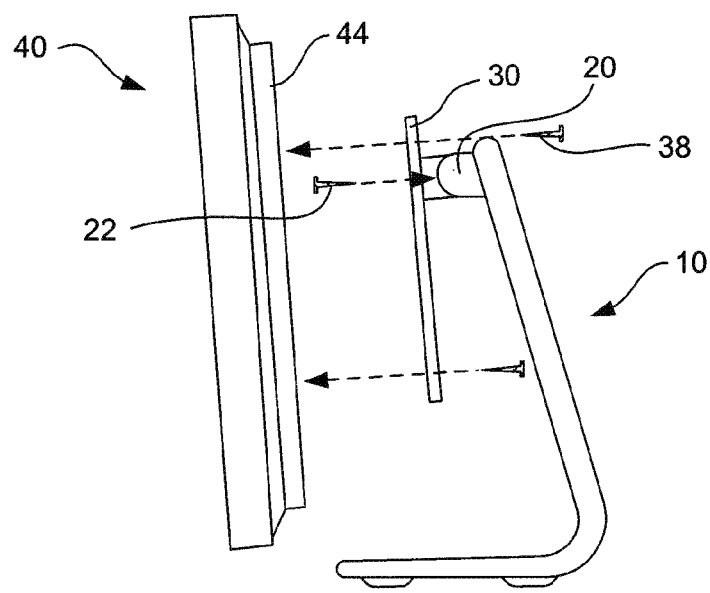
FIGS. 3A and 3B depict a side exploded assembly view of a flat panel monitor stand and flat panel monitor in both a first relative low position and a second relative high position in accordance with examples of the present disclosure.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

It is noted that when discussing the flat panel monitor stand, the free-standing flat panel monitor system, or the methods of the present disclosure, each of these discussions can be considered applicable to other examples, whether or not they are explicitly discussed in the context of that example. Thus, for example, in discussing details about the flat panel monitor stand per se, or the method, such discussion also refers to the other example, and vice versa.

In accordance with an example of the present disclosure, a flat panel monitor stand can comprise a base including a pedestal and a support arm extending upwardly from the pedestal, the support arm including a top portion being distally positioned with respect to the pedestal. The stand can also include a tilt mechanism connected to the top portion of the support arm. A bracket is pivotally attached to the tilt mechanism at an off-center location on the bracket so that the bracket has a low position and a high position when pivoted about the tilt mechanism. The bracket can also be attachable to a flat panel monitor in both the low position and the high position without reorienting the flat panel monitor.

In a related example, a free-standing flat panel monitor system can comprise the flat panel monitor as part of the system. The flat panel monitor can be attached to the bracket and the bracket can be locked in the low position or the high position.

Turning to certain specific examples that illustrate examples of the present disclosure, FIGS. 1A and 1B set forth perspective views of the flat panel monitor stands and the free-standing flat panel monitor systems described herein. Specifically, as shown, a base 10 is provided that includes a pedestal 12 and a support arm 14 (the reference numeral shown at a top portion distally located with respect to the pedestal). Attached to the support arm is a tilt mechanism 20. The tilt mechanism can provide bi-directional tilting action (e.g., up and down), or can provide omni-directional tiling action (e.g., up and down and/or side-to-side). As illustrated, FIG. 1A shows a bracket 30 attached to the tilt mechanism in a relative low position, and FIG. 1B shows the bracket attached to the tilt mechanism in a relative high position. In either configuration, a monitor 40 having a viewing surface 42 and a mounting surface 44 is attached in an upright position (with respect to a surface where the base is resting) to the bracket, thus providing a two-height option to a consumer. Thus, in either position, the monitor can be mounted to the bracket in its upright, viewing position. The monitor is not reoriented for mounting, but rather is merely raised or lowered to its appropriate height for mounting to the bracket based on whether the low position or high position is selected. In other words, the bracket is configured to be attached to the monitor similarly in both positions, even though the mounting bracket has been turned 180 degrees about a pivot (not shown in FIGS. 1A and 1B, but shown below in FIGS. 2A and 2B).

FIGS. 2A and 2B show in further detail the mechanism by which the bracket 30 can be positioned at two separate heights (the relative low position of FIG. 2A and the relative high position of FIG. 2B) without removing the bracket from its attachment to the tilting mechanism. Specifically, the bracket is pivotally connected to the base 10 through the tilt mechanism (not shown in FIGS. 2A and 2B, but shown above in FIGS. 2A and 2B). The bracket includes a pivot 32 that allows the bracket to turn about the tilt mechanism. This turning or pivoting is not to be confused with the tilting action of the tilt mechanism. This is an independent turning or pivoting action that occurs to spin the bracket from a low position to a high position. Tilting of the bracket using the tilt mechanism is a separate and distinct articulation for adjusting the viewing angle of the monitor, not the height of the monitor. As shown, the pivot is positioned at a location on the bracket that is "off-center." This positioning provides the ability of the bracket to have two different heights when the bracket is turned 180 degrees from the low position to the high position, or vice versa. Once the bracket is positioned in the desired orientation (low position of FIG. 2A or high position of 2B), the bracket can be locked in position with respect to the base/tilt mechanism. The locking mechanism can include screws or other fasteners that hold the bracket in position with respect to the tilt mechanism. The locking mechanism can alternatively include a locking pivot that holds the bracket in either position. The locking mechanism may also be a clip that holds the bracket in position with respect to the tilt mechanism. In the example shown, apertures 34,36 are present for accepting screws (not shown) to complete the assembly. Specifically, apertures 34 near the pivot can be used for locking the bracket in place with respect to the tilt mechanism in either the low position or the high position. Apertures 36 near each of the four corners can be used to mount the bracket to the flat panel monitor, whether the bracket is locked in the low position or the high position, as will be shown in further detail hereafter.

Figure 3B:
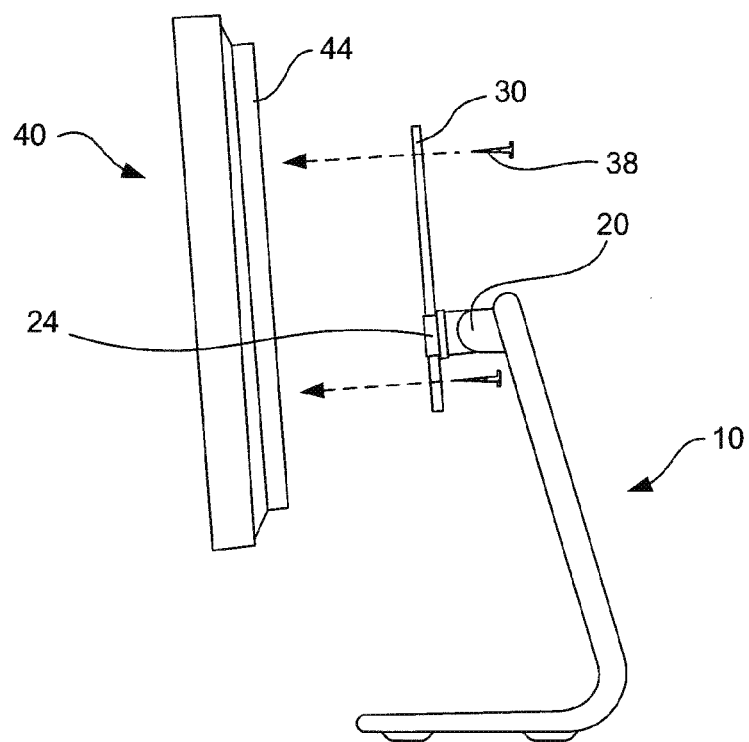

FIGS. 3A and 3B depict further detail regarding the locking of the bracket 30 as well as the attaching of the flat panel monitor 40 to the bracket. As previously described, the base 10 and the tilt mechanism 20 provide support and tilting action, respectively, to the bracket and flat panel monitor, when attached. With this view, the pivot is not shown, but can be seen in FIGS. 2A and 2B. Screws 38 are used to attach the bracket to a mounting surface 44 of the flat panel monitor. The screws partially pass through the bracket (stopping at the screw head) and into the flat panel monitor, holding the monitor firmly against the bracket. In FIG. 3A, screws 22 are also shown as being used to lock the bracket in position with respect to the tilt mechanism and the base. However, there are other locking mechanisms that can be used. For example, in FIG. 3B, a locking clip 24 is used to lock the bracket in position with respect to the tilt mechanism and the base. Either locking mechanism can be used to lock the bracket in the low position of FIG. 3A or the high position of FIG. 3B. In still other embodiments, other locking mechanisms can also be used, such as a locking pivot or other mechanical locking mechanism that would be known by one skilled in the art after considering the present disclosure.

Figure 4A:
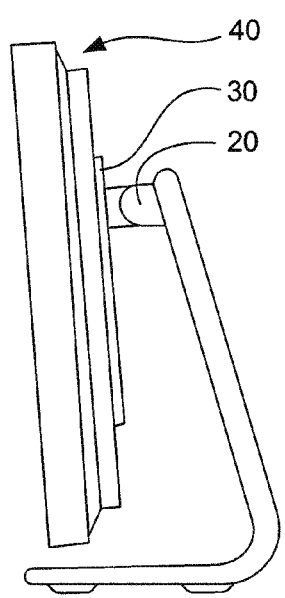
FIGS. 4A-4D depict various configurations of assembled free-standing flat panel monitor systems in accordance with examples of the present disclosure.
Figure 4B:
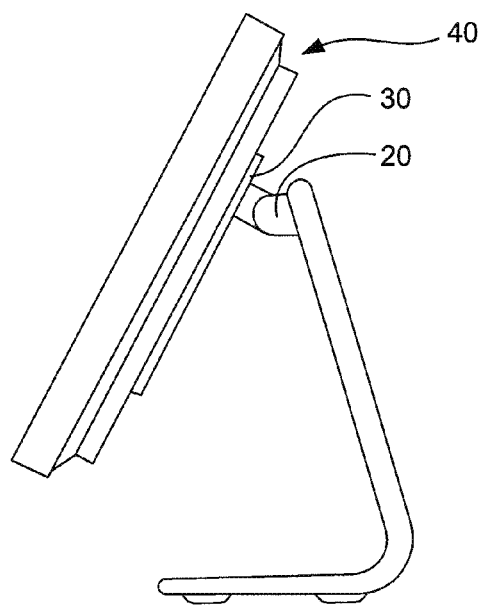
Figure 4C:
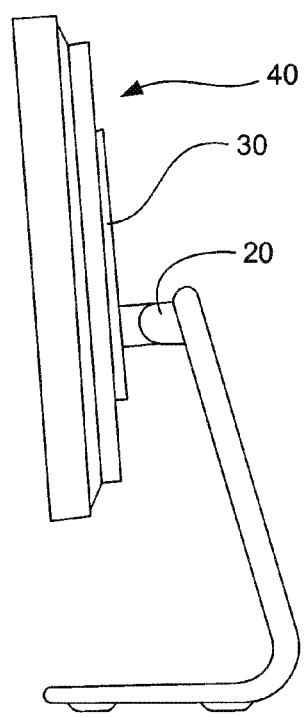
Figure 4D:
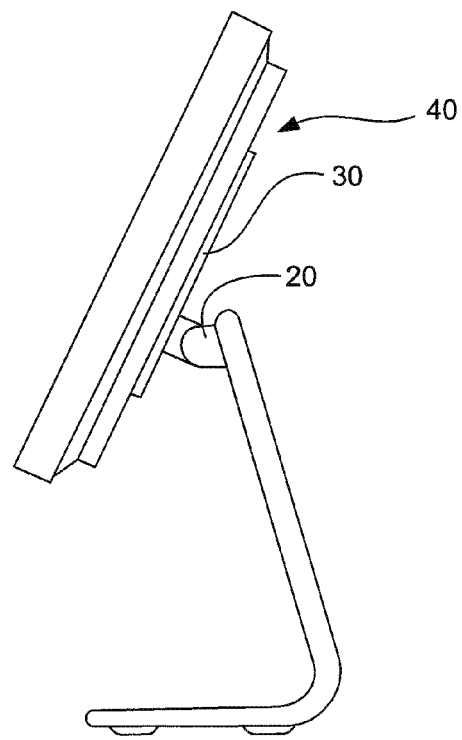

FIGS. 4A-4D depict various configurations of an assembled free-standing flat panel monitor system. FIG. 4A, for example, shows the bracket 30 pivoted and locked in a low position with the tilt mechanism 20 providing a slightly downward facing flat panel monitor 40. FIG. 4B depicts the bracket pivoted and locked again in the low position with the tilt mechanism providing an upward facing monitor display. FIG. 4C depicts the bracket pivoted and locked in a high position with the tilt mechanism providing a slightly downward facing monitor display. FIG. 4D alternatively depicts the bracket pivoted and locked again in the high position with the tilt mechanism providing an upward facing monitor display. These configurations are provided as exemplary of what consumers or users may desire for a given application. For example, a desktop computer user may prefer a slightly downward facing monitor, whereas a standing clerk at a business may desire an upward facing viewing monitor. Relative high positioning or relative low positioning of the bracket may depend on the height of the desk or table top surface and the height of the user, for example.

Figure 5:
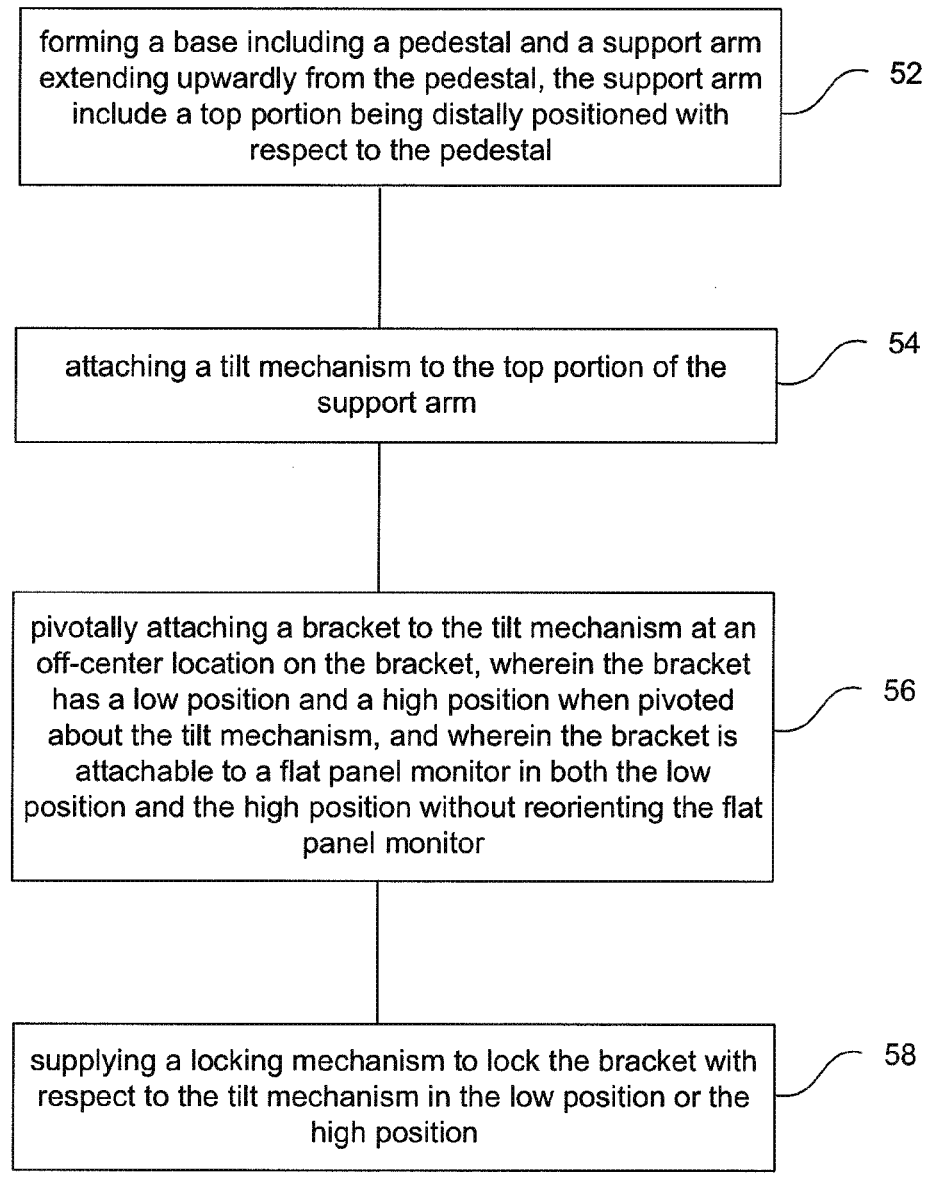
FIG. 5 is a flow diagram of a method of making a flat panel monitor stand in accordance with examples of the present disclosure.

FIG. 5 sets forth methods of making a flat panel monitor stand 50. The methods can comprise forming 52 a base including a pedestal and a support arm extending upwardly from the pedestal, the support arm including a top portion being distally positioned with respect to the pedestal. Other steps include attaching 54 a tilt mechanism to the top portion of the support arm, and pivotally attaching 56 a bracket to the tilt mechanism at an off-center location on the bracket so that the bracket has a low position and a high position when pivoted about the tilt mechanism. The bracket is thus attachable to a flat panel monitor in both the low position and the high position without reorienting the flat panel monitor. In one example, the monitor can be held in its upright position for attachment in either the low position or the high position. The method further includes supplying 58 a locking mechanism to lock the bracket with respect to the tilt mechanism in the low position or the high position.

Figure 6:
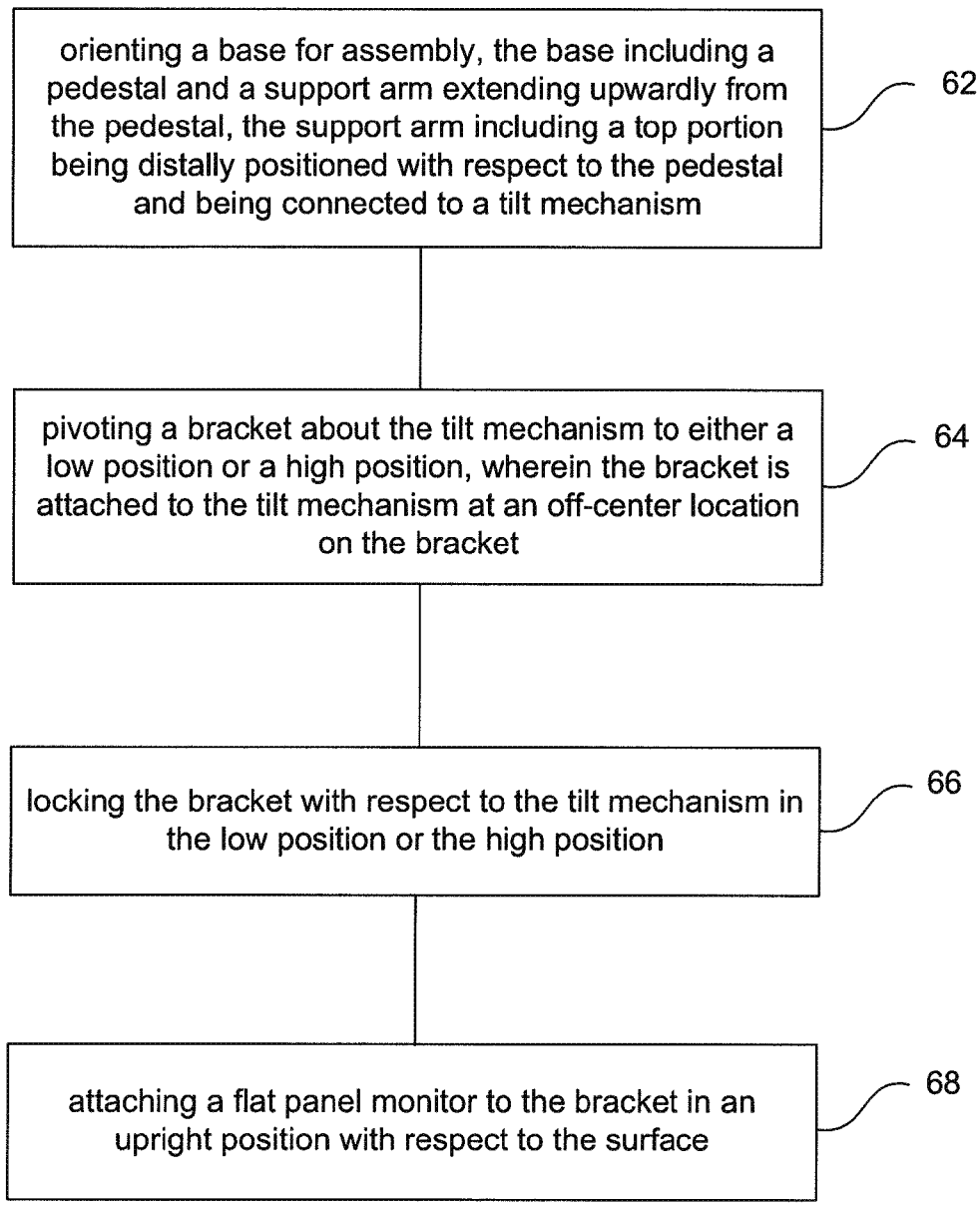
FIG. 6 is a flow diagram of a method of assembling and positioning a flat panel monitor on a stand in accordance with examples of the present disclosure.

In another example, as shown in FIG. 6, methods of assembling and positioning a flat panel monitor on a stand 60 can comprise orienting 62 a base for assembly, the base including a pedestal and a support arm extending upwardly from the pedestal, the support arm including a top portion being distally positioned with respect to the pedestal and being connected to a tilt mechanism.

Additional steps include pivoting 64 a bracket about the tilt mechanism to either a low position or a high position, wherein the bracket is attached to the tilt mechanism at an off-center location on the bracket, and further include locking 66 the bracket with respect to the tilt mechanism in the low position or the high position. In no particular order, an additional step comprises attaching 68 a flat panel monitor to the bracket in an upright position with respect to the surface. Optionally, the method further comprises the step of adjusting the tilt mechanism, independent of the pivoting step, to provide a viewing angle for the monitor.

With respect to the methods described herein, examples of embodiments described above as it relates to the flat panel monitor stands and the free-standing flat panel monitor systems are applicable to the methods described herein. For example, the tilt mechanism can provide bi-directional tilting action or omni-directional tilting action. Furthermore, a locking mechanism can be present to lock the bracket with respect to the tilt mechanism in the low position or the high position. An exemplary locking mechanism includes threaded screws that pass partially through the bracket and into the tilt mechanism, holding the bracket firmly against the tilt mechanism. The locking mechanism can also include a mechanical clip that fixes the pivotal relationship between the bracket and the tilt mechanism. It is also noted that the relative low position and the relative high position can be 180 degrees apart when the bracket is pivoted about the tilt mechanism.

While the forgoing examples are illustrative of the principles of the present technology in particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A flat panel monitor stand, comprising:
   a base including a pedestal and a support arm extending upwardly from the pedestal, the support arm including a top portion being distally positioned with respect to the pedestal;
   a tilt mechanism connected to the top portion of the support arm; and
   a bracket pivotally attached to the tilt mechanism at an off-center location on the bracket, the bracket being pivotable about the tilt mechanism into each of a low position and a high position, the bracket further being attachable to a flat panel monitor in each of the low position and the high position while maintaining a fixed upright orientation of the flat panel monitor.

2. The monitor stand of claim 1, wherein the tilt mechanism is a bi-directional tilt mechanism.

3. The monitor stand of claim 1, wherein the tilt mechanism is an omni-directional tilt mechanism.

4. The monitor stand of claim 1, further comprising a locking mechanism to lock the bracket with respect to the tilt mechanism in the low position or the high position.

5. The monitor stand of claim 4, wherein the locking mechanism includes threaded screws that pass partially through the bracket and into the tilt mechanism, holding the bracket firmly against the tilt mechanism.

6. The monitor stand of claim 4, wherein the locking mechanism is a mechanical clip that fixes the pivotal relationship between the bracket and the tilt mechanism.

7. The monitor stand of claim 1, wherein the low position and the high position are 180 degrees apart when the bracket is pivoted about the tilt mechanism.

8. A free-standing flat panel monitor system, comprising:
the flat panel monitor stand of claim 1; and
the flat panel monitor.

9. The free-standing flat panel monitor system of claim 8, wherein the flat panel monitor is attached to the bracket and the bracket is locked in the low position or the high position.

10. A method of making a flat panel monitor stand, comprising:
forming a base including a pedestal and a support arm extending upwardly from the pedestal, the support arm including a top portion being distally positioned with respect to the pedestal;
attaching a tilt mechanism to the top portion of the support arm;
pivotally attaching a bracket to the tilt mechanism at an off-center location on the bracket, the bracket being pivotable about the tilt mechanism into either of a low position and a high position, the bracket further being attachable to a flat panel monitor when in either of the low position or the high position while maintaining a fixed upright orientation of the flat panel monitor; and
supplying a locking mechanism to lock the bracket with respect to the tilt mechanism in the low position or the high position.

11. The method of claim 10, wherein a first portion of the tilt mechanism is formed with or attached to the base, and a second portion of the tilt mechanism is hingedly attached to the first portion of the tilt mechanism.

12. The method of claim 10, wherein the locking mechanism includes threaded screws that pass through the bracket and into the tilt mechanism.

13. The method of claim 10, wherein the low position and the high position are 180 degrees apart when the bracket is pivoted about the tilt mechanism.

14. A method of assembling and positioning a flat panel monitor on a stand, comprising:
orienting a base for assembly, the base including a pedestal and a support arm extending upwardly from the pedestal, the support arm including a top portion being distally positioned with respect to the pedestal and being connected to a tilt mechanism;
pivoting a bracket about the tilt mechanism to either a low position or a high position, wherein the bracket is attached to the tilt mechanism at an off-center location on the bracket and can be pivoted to each of the low position or high position;
locking the bracket with respect to the tilt mechanism in the low position or the high position; and
attaching a flat panel monitor to the bracket, the flat panel monitor maintained a fixed upright orientation in either of the low position or the high position.

15. The method of claim 14, further comprising the step of adjusting the tilt mechanism, independent of the pivoting step, to provide a viewing angle for the monitor.

\* \* \* \* \*